(12) United States Patent
Hayami

(10) Patent No.: US 12,395,345 B2
(45) Date of Patent: Aug. 19, 2025

(54) INFORMATION PROCESSING APPARATUS AND CONTROL METHOD THEREFOR

(71) Applicant: CANON KABUSHIKI KAISHA, Tokyo (JP)

(72) Inventor: Yoshikazu Hayami, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 363 days.

(21) Appl. No.: 17/937,184

(22) Filed: Sep. 30, 2022

(65) Prior Publication Data

US 2023/0103698 A1 Apr. 6, 2023

(30) Foreign Application Priority Data

Oct. 4, 2021 (JP) .................................. 2021-163198

(51) Int. Cl.
*H04L 29/06* (2006.01)
*G06F 3/12* (2006.01)
*H04L 9/06* (2006.01)
*H04L 9/32* (2006.01)

(52) U.S. Cl.
CPC .......... *H04L 9/3239* (2013.01); *G06F 3/1222* (2013.01); *G06F 3/1238* (2013.01); *H04L 9/0643* (2013.01)

(58) Field of Classification Search
CPC ... H04L 9/0643; H04L 9/3235; G06F 3/1222; G06F 3/1238
See application file for complete search history.

(56) References Cited

U.S. PATENT DOCUMENTS 8,094,812 B1 * 1/2012 Tsang ................... H04L 63/126
713/184
2011/0289571 A1 * 11/2011 Yasuhara ................ G06F 21/31
726/7

FOREIGN PATENT DOCUMENTS

JP 2009093342 A 4/2009

* cited by examiner

*Primary Examiner* — Jeffrey C Pwu
*Assistant Examiner* — Thong P Truong
(74) *Attorney, Agent, or Firm* — Canon U.S.A., Inc. IP Division

(57) ABSTRACT

An information processing apparatus that executes authentication processing using authentication information received from a terminal includes a first authentication unit configured to execute first authentication processing using second authentication information and preliminarily managed authentication information, the second authentication information being obtained by encrypting first authentication information received from the terminal, and a second authentication unit configured to execute second authentication processing different from the first authentication processing, wherein, in a case where the second authentication information is authenticated by the first authentication unit, the first authentication information is managed to be usable by the second authentication unit.

8 Claims, 15 Drawing Sheets

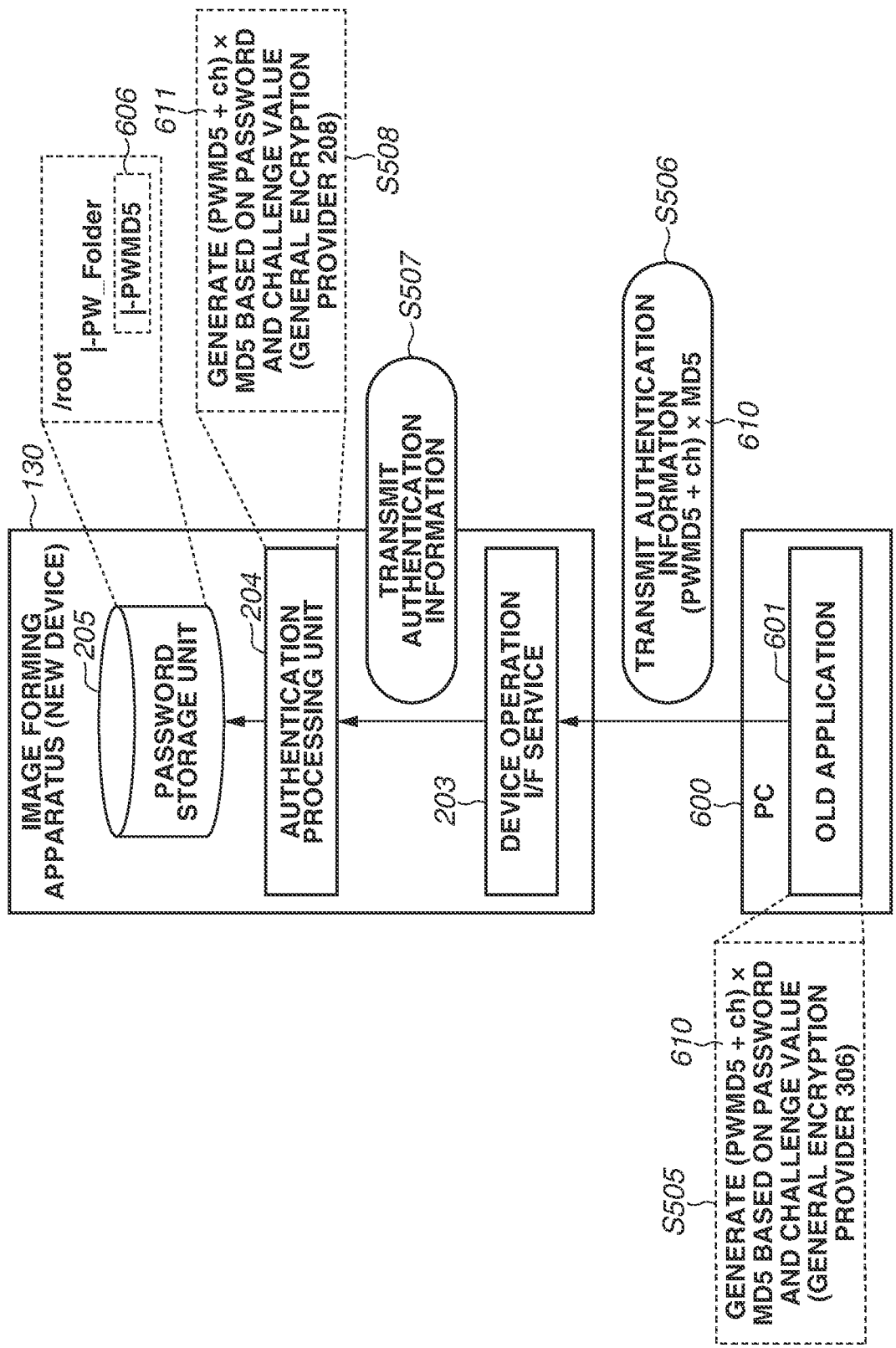

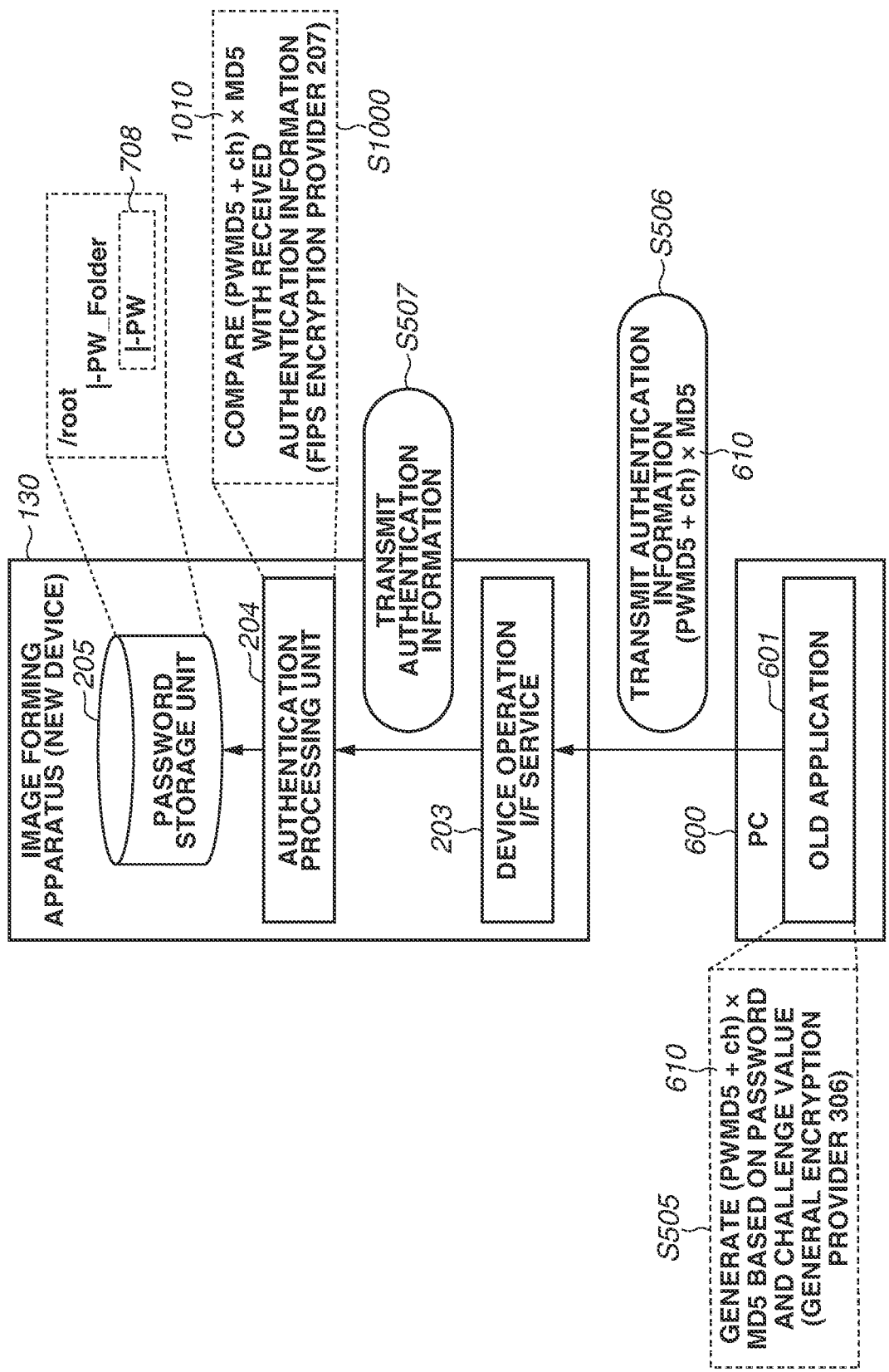

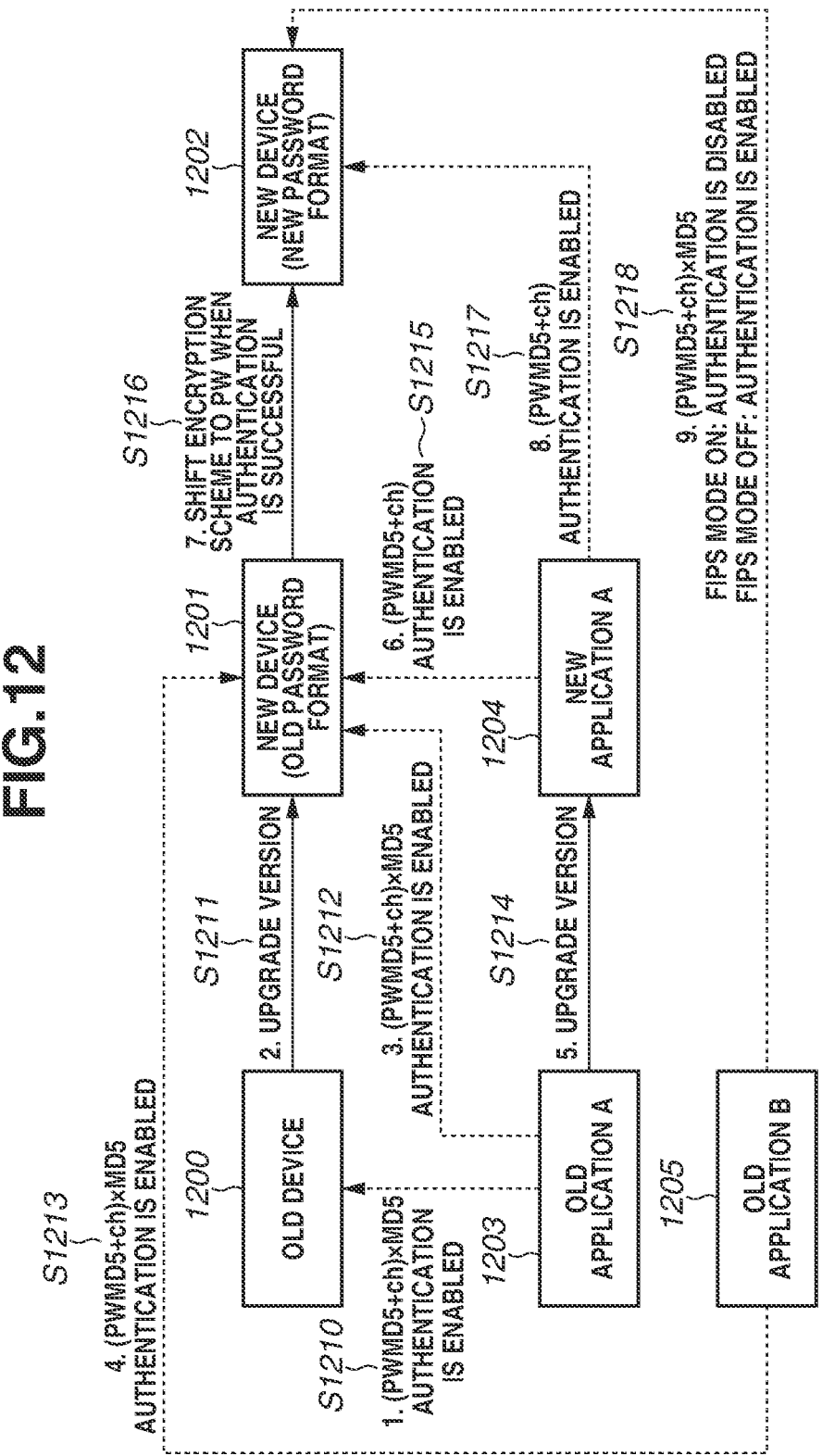

INFORMATION PROCESSING APPARATUS AND CONTROL METHOD THEREFOR

BACKGROUND

Field of the Disclosure

The present disclosure relates to an information processing apparatus that executes user authentication and a control method for the system.

Description of the Related Art

A process in which a personal computer (PC) application for remotely operating an image forming apparatus such as a multifunction peripheral (MFP) accesses the image forming apparatus involves an administrator authentication process. Examples of the operation may include various operations such as installation of an application for expanding a function of the image forming apparatus and acquisition of information about the image forming apparatus.

In the administrator authentication process, a user is prompted to input a password (PW) for accessing the image forming apparatus on the PC application. An authentication system of the image forming apparatus that has received the PW compares the PW with a PW stored in the authentication system, and determines whether the authentication is successful or not based on whether the PWs match. Specifically, in a case where the PW stored in the authentication system is hashed using a hash algorithm, such as a Message Digest algorithm (MD) 5 hash scheme (hereinafter, PW subjected to MD5 hash processing is referred to as PWMD5), and the hashed PW is stored, the PC application transmits a value obtained by adding a challenge value ch to PWMD5 and further hashing the resultant value using the MD5 hash scheme (the value is hereinafter expressed as (PWMD5+ch)×MD5) to the image forming apparatus. The authentication system of the image forming apparatus generates (PWMD5+ch)×MD5 based on the password PWMD5 stored in the authentication system, compares the generated (PWMD5+ch)×MD5 with (PWMD5+ch)×MD5 received from the PC application, and determines whether the authentication is successful or not. Japanese Patent Application Laid-Open No. 2009-93342 discusses a network device management apparatus that calculates a hash value of a received password using an MD5 function and performs comparison and authentication.

Meanwhile, some recent personal computers (PCs) and image forming apparatuses are provided with a function called Federal Information Processing Standards (FIPS) mode. FIPS are a series of government standards that define how certain things, such as an encryption algorithm, are used in the government. More specifically, MD5 hash and the like are designated as compromised algorithms in the FIPS, and such algorithms cannot be used on devices in which the FIPS mode is enabled.

If a device that has been used by a user is upgraded to a device supporting the FIPS mode by, for example, upgrading the version of firmware for the device, the following issue arises (for convenience of explanation, an encryption algorithm prohibited to be used in the FIPS mode is referred to as a "first encryption scheme"). In the device that has managed authentication information encrypted by the first encryption scheme and has performed authentication processing using the managed authentication information, authentication information to be managed after the device is upgraded to the device supporting the FIPS mode is the same as the authentication information managed in the device before support of the FIPS mode. In other words, the device continuously holds the authentication information encrypted by the first encryption scheme, and thus the device cannot perform the authentication processing without encrypting authentication information sent from a terminal such as a PC by the first encryption scheme. This is inconsistent with the prohibition of the first encryption scheme in the FIPS mode. In addition, the device cannot decrypt the authentication information encrypted by the first encryption scheme.

Accordingly, one way to deal with the above may be to issue an authentication information resetting request to the user to renew the authentication information stored in the device. However, if there is a plurality of target devices, the user needs to perform a number of resetting processes corresponding to the number of target devices.

SUMMARY

Embodiments of the present disclosure are directed to a technique for managing authentication information that can be used by a new authentication method so that a device not supporting a Federal Information Processing Standards (FIPS) mode can be shifted to a device supporting the FIPS mode while saving user's time and effort to reset the authentication information.

According to embodiments of the present disclosure, an information processing apparatus that executes authentication processing using authentication information received from a terminal includes a first authentication unit configured to execute first authentication processing using second authentication information and preliminarily managed authentication information, the second authentication information being obtained by encrypting first authentication information received from the terminal, and a second authentication unit configured to execute second authentication processing different from the first authentication processing, wherein, in a case where the second authentication information is authenticated by the first authentication unit, the first authentication information is managed to be usable by the second authentication unit.

Further features of the present disclosure will become apparent from the following description of exemplary embodiments with reference to the attached drawings.

BRIEF DESCRIPTION OF THE DRAWINGS

FIG. 9 is a block diagram illustrating authentication processing using a combination of the old application and the new device (old password method).

FIG. 10 is a block diagram illustrating authentication processing using a combination of the old application and the new device (new password method).

FIG. 12 is a block diagram illustrating information indicating whether each authentication method is enabled or disabled in the entire system when the version of the device is upgraded from the old device to the new device.

DESCRIPTION OF THE EMBODIMENTS

Exemplary embodiments of the present disclosure will be described below with reference to the drawings.

Hereinafter, a conventional non-Federal Information Processing Standards (FIPS)-compliant application is referred to as an old application, a FIPS-compliant application is referred to as a new application, a conventional non-FIPS-compliant image forming apparatus is referred to as an old device, and a FIPS-compliant image forming apparatus is referred to as a new device.

A first exemplary embodiment illustrates an example of basic processing in which a password encryption scheme is shifted to a new encryption scheme in combination with a new application in a case where the version of a device is upgraded from the old device to the new device.

In the following exemplary embodiments, a non-FIPS-compliant application is referred to as an old application, a FIPS-compliant application is referred to as a new application, a non-FIPS-compliant image forming apparatus is referred to as an old device, and a FIPS-compliant image forming apparatus is referred to as a new device. For convenience of explanation, the old device and the new device will be described using an image forming apparatus 130 as an example. However, the old device and the new device are not limited to the image forming apparatus 130. Any information processing apparatus including an authentication function can be used as the old device and the new device.

Figure 13:
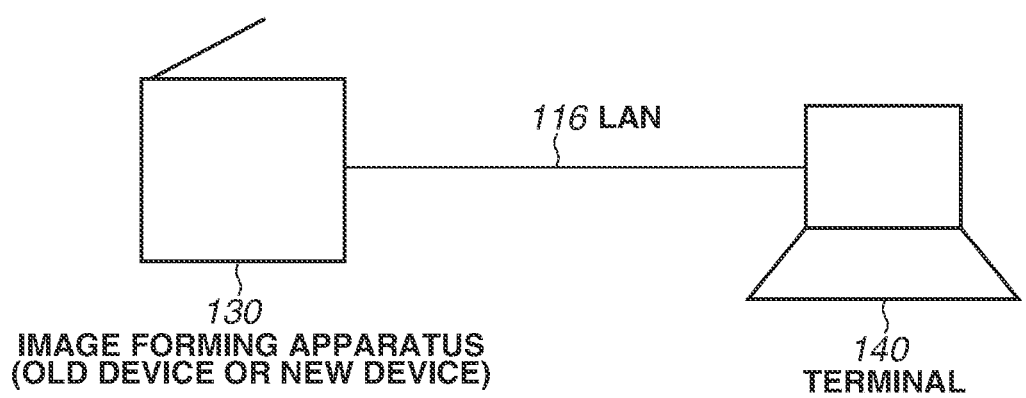
FIG. 13 illustrates a system configuration including at least the image forming apparatus and a terminal.

FIG. 13 illustrates a system including at least the image forming apparatus 130 and a terminal 140. The image forming apparatus 130 and the terminal 140 are assumed to be connected via a local area network (LAN) 116.

Figure 1:
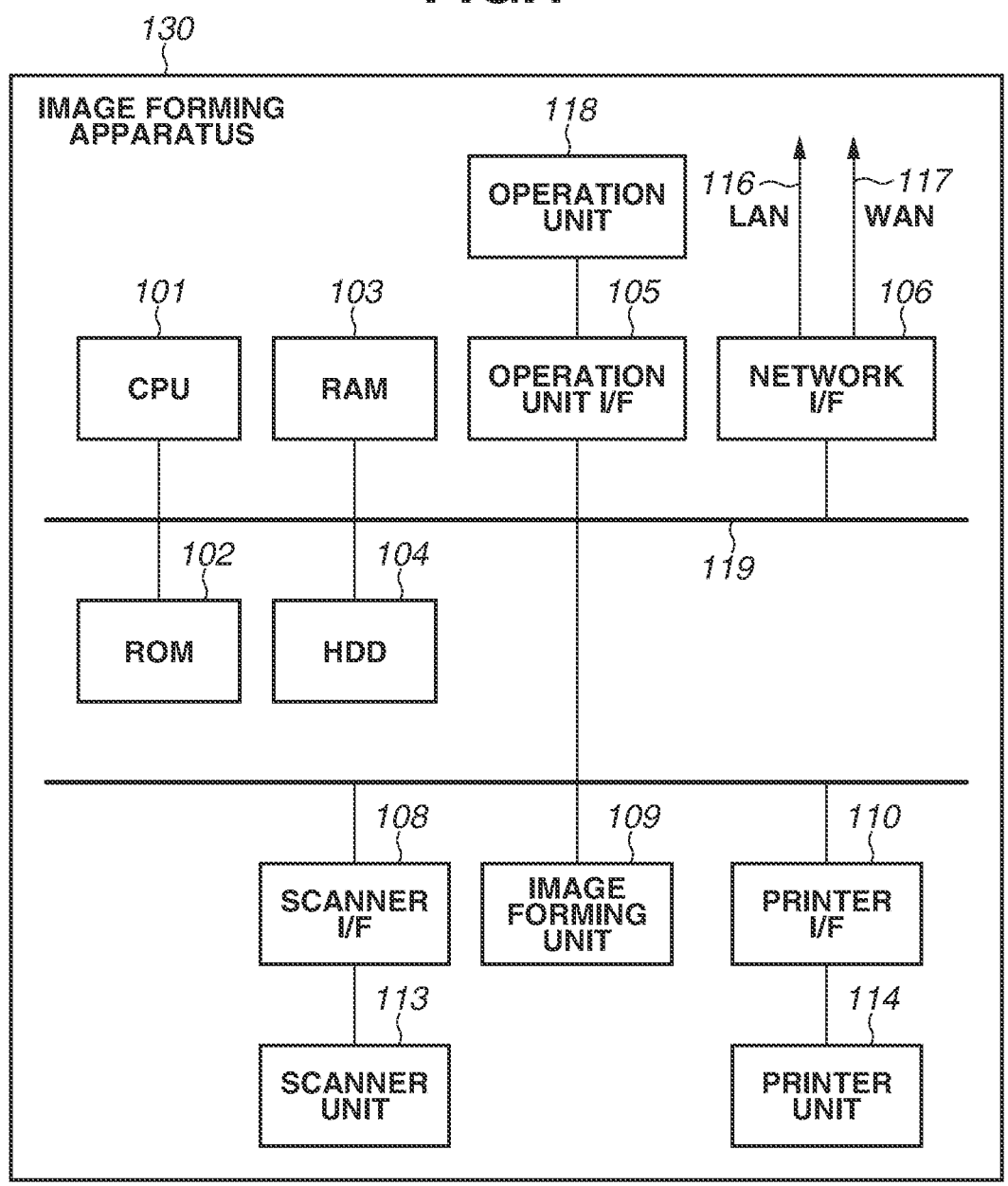
FIG. 1 is a block diagram illustrating a hardware configuration of an image forming apparatus.

FIG. 1 is a block diagram illustrating a hardware configuration of the image forming apparatus 130 having a print function, a scan function, and a network communication function.

The image forming apparatus 130 is electrically connected to a scanner unit 113 and a printer unit 114 and is also connected to an external device via the LAN 116. A central processing unit (CPU) 101 controls access to various types of connected hardware modules in an integrated manner based on a control program or the like stored in a read-only memory (ROM) 102, and also controls various types of processing to be performed in a controller in an integrated manner.

The ROM 102 is a read-only non-volatile storage area and stores a boot program, firmware, and the like for the image forming apparatus 130. A random access memory (RAM) 103 is a system work memory for operating the CPU 101 and temporarily stores various types of data. The RAM 103 is composed of a ferric RAM (FRAM®) or a static RAM (SRAM) in which the stored contents can be retained even after power-off, a dynamic RAM (DRAM) in which the stored contents are erased after power-off, or the like. A hard disk drive (HDD) 104 is a non-volatile storage area and stores a system bundle and the like. Firmware for the image forming apparatus 130 is stored in the HDD 104.

An operation unit interface (I/F) 105 is an interface unit that connects a system bus 119 and an operation unit 118 to each other. Specifically, the operation unit I/F 105 receives data to be displayed on the operation unit 118 from the system bus 119 and displays the received data thereon, as well as outputs information input from the operation unit 118 to the system bus 119. Issuance of a user's instruction and presentation of information on the image forming apparatus 130 are carried out via the operation unit 118.

A network I/F 106 is connected to the LAN 116, a wide area network (WAN) 117, and the system bus 119, and is configured to input and output information to and from an external device.

A scanner I/F 108 is configured to correct, process, and edit image data received from the scanner unit 113. An image forming unit 109 is configured to perform orientation conversion, image compression, decompression, and the like on the image data. A print I/F 110 receives the image data sent from the image forming unit 109, and the printer unit 114 prints the image data after image formation.

Figure 2:
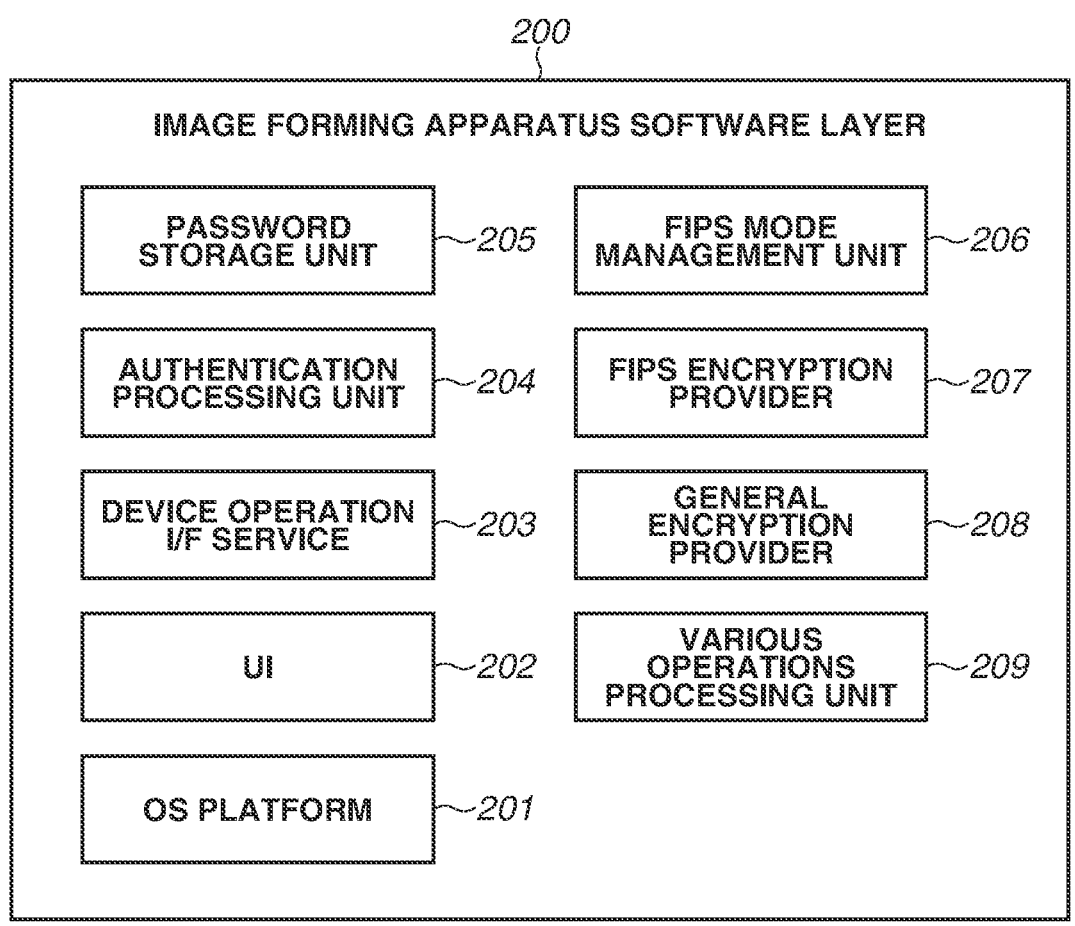
FIG. 2 is a block diagram illustrating a software module layer of the image forming apparatus.

FIG. 2 is a block diagram illustrating a software module layer 200 of the image forming apparatus 130 according to the present exemplary embodiment. Software modules illustrated in FIG. 2 and subsequent drawings are stored in the ROM 102 or the HDD 104 and are executed by the CPU 101. Various types of information to be used in execution of the software modules is held in the RAM 103 or the HDD 104 and is exchanged between software functions.

Communication with an external device is performed using the network I/F 106. A terminal such as a personal computer (PC) on which a device operation application 300 to be described below is installed includes an operation unit, an operation unit I/F, a network I/F, a CPU, a RAM, a ROM, and an HDD, similar to the image forming apparatus 130. Various functions of the terminal are similar to those of the image forming apparatus 130, and thus the descriptions thereof are omitted.

Next, software modules of the image forming apparatus 130 will be described. The image forming apparatus 130 includes an operating system (OS) platform 201. Various modules including a user interface (UI) 202, a device operation I/F service 203, an authentication processing unit 204, a password storage unit 205, a FIPS mode management unit 206, a FIPS encryption provider 207, a general encryption provider 208, and a various operations processing unit 209 to be described below are assumed to be implemented on the OS platform 201.

The UI 202 is a user interface module configured to interface between the image forming apparatus 130 and a user operation when a user performs various operations and settings on the image forming apparatus 130. The module transfers input information to various modules in response to an operation by an operator to thereby make a request for processing or change data settings.

The device operation I/F service 203 is an interface that receives an operation instruction for the image forming apparatus 130 from a terminal such as a PC. The device operation I/F service 203 includes a challenge value acquisition application programming interface (API) for acquiring a challenge value to be used in authentication processing to be described below. Other examples of the operation instruction include an instruction to install a plug-in application for expanding functions of the image forming apparatus 130, and an instruction to acquire setting information about the image forming apparatus 130.

The information received by the device operation I/F service 203 from the terminal includes not only the operation instruction, but also authentication information such as a password and a user identification (ID). The contents of the authentication information vary depending on whether the image forming apparatus 130 is the old device or the new device. If the image forming apparatus 130 is the old device, a value "(PWMD5+ch)×MD5", which is obtained by adding a challenge value ch to a hash value (hash value calculated using a Message Digest algorithm (MD) 5 hash scheme) of a password received from the terminal and further hashing the resultant value using the MD5 hash scheme, is used as authentication information to be compared. On the other hand, if the image forming apparatus 130 is the new device, a value obtained by adding the challenge value ch to the password received from the terminal (the value is hereinafter expressed as "PW+ch") is used as the authentication information to be compared. In other words, the authentication information to be compared in the old device is different from that in the new device, so that authentication processing to be performed varies depending on the authentication information.

In the present exemplary embodiment, for convenience of explanation, it is assumed that the old device has used the MD5 hash scheme as the encryption algorithm. However, the encryption algorithm used in the old device is not limited to the MD5 hash scheme. Any encryption algorithm can be used as long as the use of the encryption algorithm is prohibited in the FIPS mode.

With reference to FIG. 2 again, the authentication information received by the device operation I/F service 203 is passed to the authentication processing unit 204. The authentication processing unit 204 compares the authentication information received from the terminal with authentication information stored in the password storage unit 205. As a result of comparison, if the authentication information received from the terminal matches the stored authentication information, it is determined that authentication processing is successful, and the result is returned to the device operation I/F service 203.

If the image forming apparatus 130 is the old device, the password storage unit 205 encrypts the value obtained by taking an MD5 hash of the password by trusted platform module (TPM) encryption and stores the encrypted value in a file. The encryption scheme is hereinafter referred to as an old password method. On the other hand, if the image forming apparatus 130 is the new device, the password storage unit 205 stores the password in the TPM-encrypted form in a file.

The encryption scheme is referred to as a new encryption scheme. Similar to the description regarding the old encryption scheme using the MD5 hash scheme as an example thereof, the TPM encryption scheme is merely used an example of the new encryption scheme. Thus, the encryption scheme is not limited to the TPM encryption scheme. Any encryption scheme can be used as long as the use of the encryption scheme is allowed in the FIPS mode.

The TPM refers to an integrated circuit (IC) chip or module mounted on a board, and is also referred to as a "security chip". The TPM has functions such as public-key cryptography (Rivest-Shamir-Adleman (RSA)) calculation, key generation, secure hash algorithm (SHA)-1 hash value calculation, random number generation, and digital signature generation. The TPM is configured to securely perform encryption and decryption, generation and verification of a digital signature, and management of an encryption key within the chip.

A password file does not exist when the image forming apparatus 130 is first activated. Accordingly, the password file is created with default values. After that, the user can change the password by designating a new password. If the user uses the new device from the beginning instead of using the new device by upgrading the version of the old device to the new device, authentication information such as a password is created by the new encryption scheme.

The FIPS mode management unit 206 is a module configured to manage whether the FIPS mode of the image forming apparatus 130 is enabled (on/off). On and off of the FIPS mode of the image forming apparatus 130 can be switched on the UI 202. It is assumed that the FIPS mode can be switched on the UI 202 by an administrator logging in to the image forming apparatus 130, or by a service engineer logging in to the image forming apparatus 130.

The FIPS encryption provider 207 is a module configured to perform encryption processing when the authentication processing unit 204 is to perform encryption processing such as hash generation. When the FIPS mode is enabled (FIPS mode is on) and the authentication processing unit 204 sends a request for a compromised algorithm such as MD5, the FIPS encryption provider 207 returns an error to the authentication processing unit 204. On the other hand, when the FIPS mode is off and the authentication processing unit 204 sends a request for the compromised algorithm such as MD5, the FIPS encryption provider 207 does not return an error, and the compromised algorithm such as MD5 hash generation can be used. In contrast, the general encryption provider 208 is a provider that can use encryption processing including the MD5 hash generation regardless of whether the FIPS mode of the FIPS mode management unit 206 is on or off.

Various providers will now be described. An encryption provider that can use only FIPS-compliant algorithms is defined as an FIPS encryption provider. Specifically, the FIPS encryption provider is configured to determine whether the FIPS mode is set as the current mode and to prohibit the use of MD5 hash in the FIPS mode. A provider that can use any type of algorithm is defined as a general encryption provider. Specifically, the general encryption provider can use MD5 hash regardless of the FIPS mode. Thus, "upgrading the terminal 140 and the image forming apparatus 130 to FIPS mode-supporting devices" is equivalent to replacement of providers of the devices with the FIPS encryption provider.

If the authentication succeeds in the authentication processing unit 204, the various operations processing unit 209 performs various instructed operations. If the authentication succeeds, the device operation I/F service 203 sends an operation request to the various operations processing unit 209.

Figure 3:
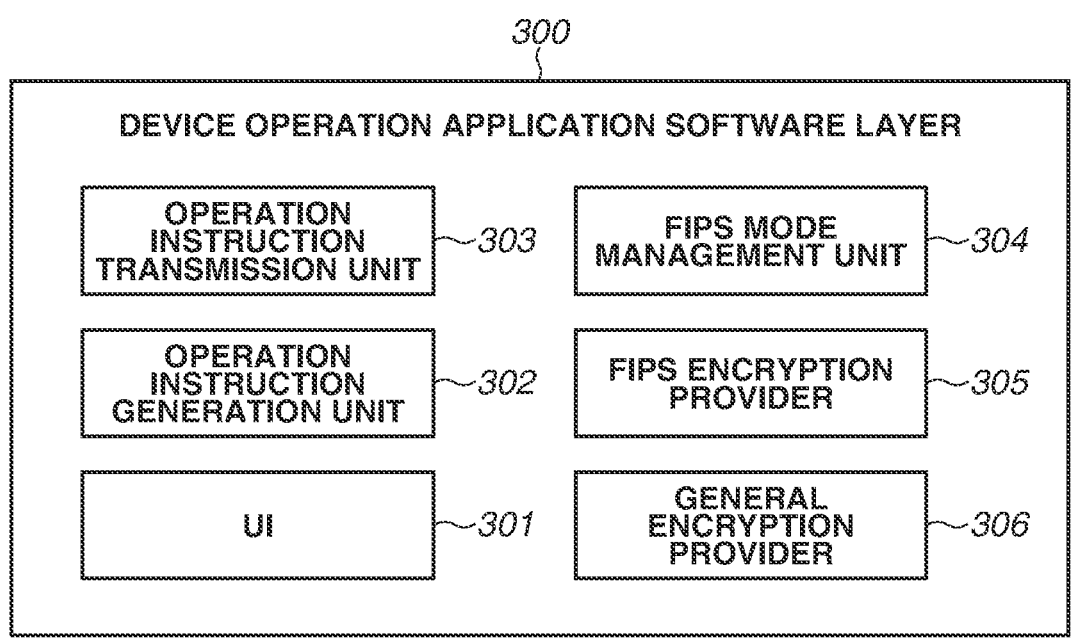
FIG. 3 is a block diagram illustrating a software module layer of a device operation application.

A software layer of the device operation application 300 installed on the terminal will be described with reference to FIG. 3. A UI 301 is a UI module configured to display a UI for the user to perform various operations on the device operation application 300. Depending on the contents of user's operation, a request for inputting authentication information (password or the like) is issued to the user. An example of the UI 301 to be used in this case will be described below with reference to FIG. 4.

An operation instruction generation unit 302 is a module configured to generate an instruction command depending on the contents instructed on the UI 301. If an instruction to perform authentication processing is issued, not only an authentication processing command, but also authentication information input on the UI 301 is encrypted. Specifically, if the device operation application 300 is the old application, authentication information (PWMD5+ch)×MD5 is generated based on the input password. On the other hand, if the device operation application 300 is the new application, authentication information PW+ch is generated based on the input password. However, if the device operation application 300 is configured to support both the old device and the new device, (PWMD5+ch)×MD5 may be generated again in a case where the authentication information is not successfully generated, and the authentication processing on the image forming apparatus 130 may be retried.

An operation instruction transmission unit 303 transmits the authentication information generated by the operation instruction generation unit 302 and the API that corresponds to the instruction and is prepared by the device operation I/F service 203. For example, if "device information acquisition" is set as the type of instruction to acquire setting information about the image forming apparatus 130, the API that corresponds to the device information acquisition invokes GetDeviceInfo as well as authentication information.

An FIPS mode management unit 304 is a module configured to manage whether the terminal is in the FIPS mode. In the case of Windows®, the FIPS mode management unit 304 is present on an OS. In the case of Windows®, on and off of the FIPS mode can be switched based on a setting on Windows®.

An FIPS encryption provider 305 is a module configured to perform encryption processing such as hash generation. When the operation instruction generation unit 302 sends a request for a compromised algorithm, such as MD5, in a situation where the FIPS mode management unit 304 indicates that the FIPS mode is on, the FIPS encryption provider 305 returns an error. On the other hand, if the FIPS mode management unit 304 indicates that the FIPS mode is off, processing using a compromised algorithm, such as MD5 hash generation, can be performed. A general encryption provider 306 is a provider that can use encryption processing including MD5 hash generation regardless of whether the FIPS mode of the FIPS mode management unit 304 is on or off.

Figure 4:
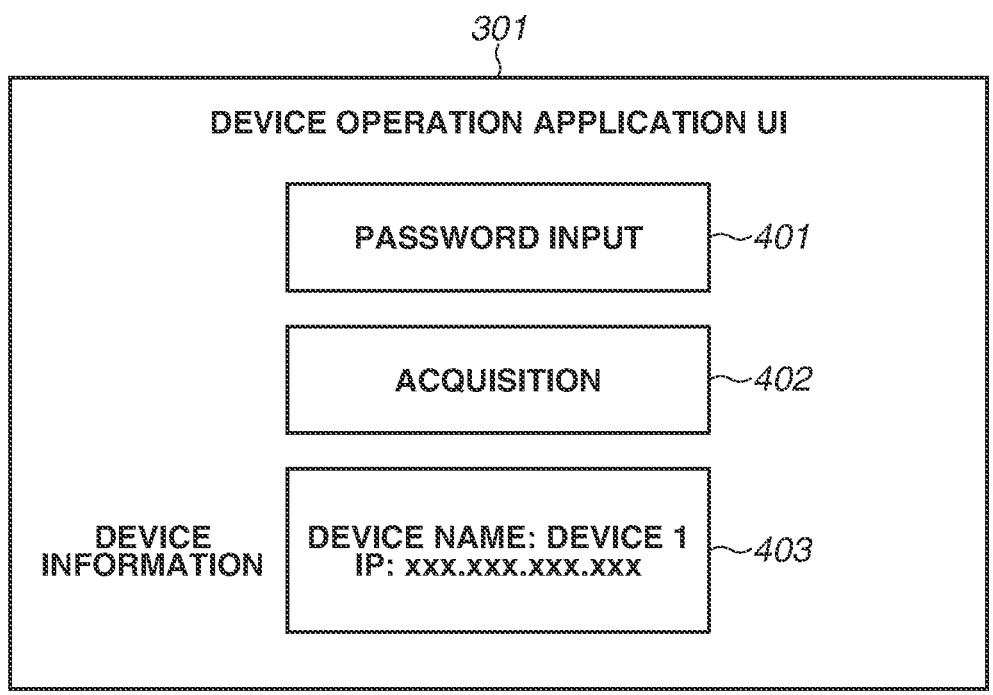
FIG. 4 illustrates a user interface (UI) for the device operation application to operate the image forming apparatus.

FIG. 4 is an example of the UI 301 of the device operation application, which is the UI for operating the image forming apparatus 130.

A password input 401 is an item where a password is input to operate the image forming apparatus 130 using the device operation application 300.

When a password is input to the password input 401 and an acquisition button 402 is selected, authentication processing using the input password input 401 is executed. If the authentication processing is successful, device information about the image forming apparatus 130 is acquired. An item 403 indicates a state where the acquired device information (e.g., a device name and an internet protocol (IP) set to the device) is displayed.

Figure 5:
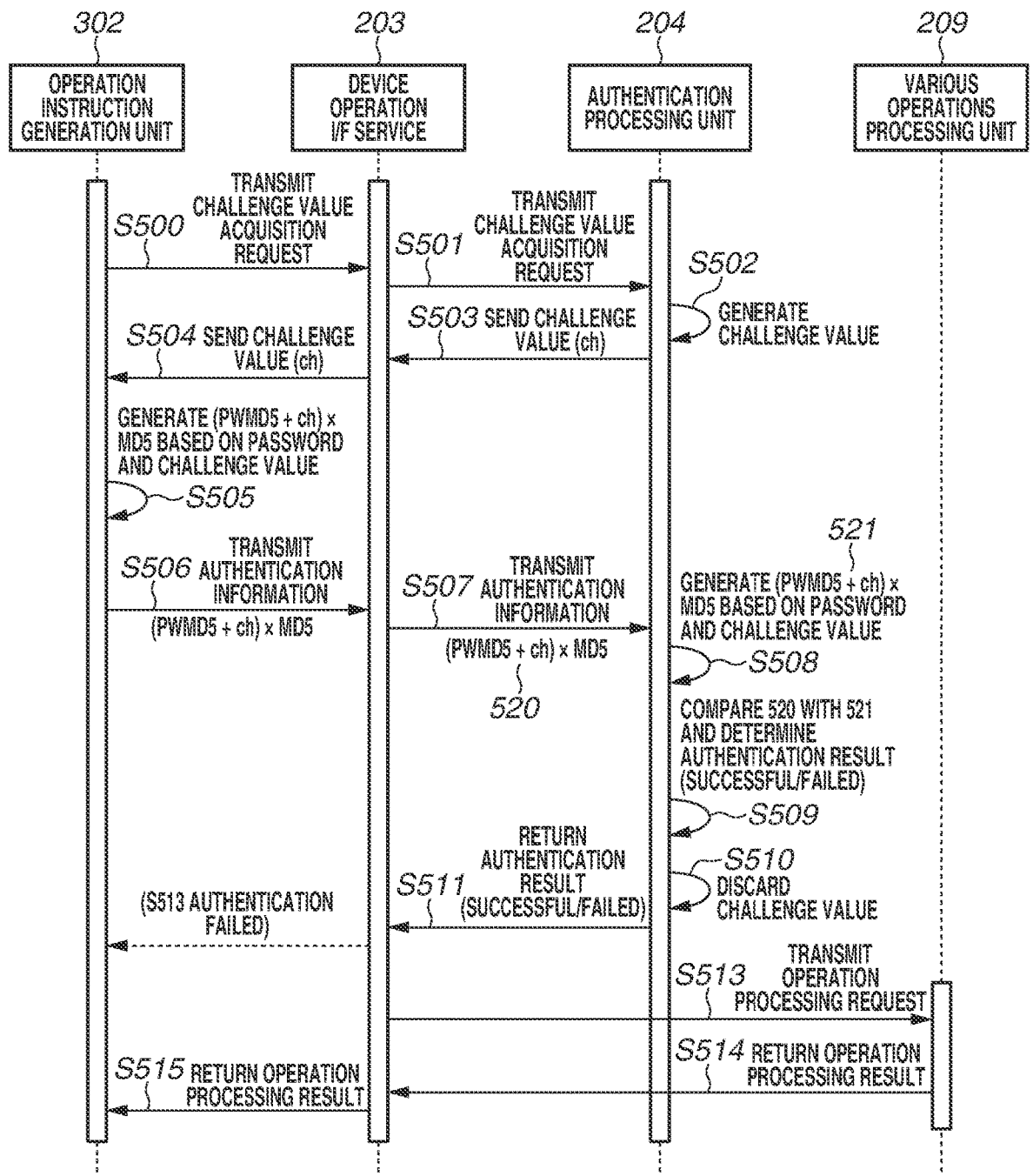
FIG. 5 is a sequence diagram illustrating processing to be performed when an authentication query is sent from the device operation application to the image forming apparatus.

FIG. 5 is a sequence diagram illustrating processing to be performed when operation instructions are sent from the operation instruction generation unit 302 of the device operation application 300 to the device operation I/F service 203 of the image forming apparatus 130. The processing illustrated in FIG. 5 will be described on an assumption that the device operation application 300 is the old application and the image forming apparatus 130 is the old device. However, the order of basic processes in an authentication sequence is not changed even when the device operation application 300 is the new application and the image forming apparatus 130 is the new device.

In step S500, the operation instruction generation unit 302 transmits a challenge value acquisition request to the device operation I/F service 203. In step S501, the device operation I/F service 203 that has received the challenge value acquisition request transmits the challenge value acquisition request to the authentication processing unit 204 that generates a challenge value. In step S502, the authentication processing unit 204 generates the challenge value and stores the generated challenge value in the memory of the image forming apparatus 130. In step S503, the challenge value generated in step S502 is sent to the device operation I/F service 203. In step S504, the challenge value is sent to the operation instruction generation unit 302.

In step S505, the operation instruction generation unit 302 that has received the challenge value calculates (PWMD5+ch)×MD5 based on the password input in the password input 401 and the received challenge value. In this case, it is assumed that the old application uses the general encryption provider 306 and the new application uses the FIPS encryption provider 305.

In step S506, the operation instruction generation unit 302 transmits authentication information 520 calculated in step S505 to the device operation I/F service 203, and invokes the API corresponding to the instructed operation among APIs prepared by the device operation I/F service 203.

In step S507, the authentication information 520 is transmitted to the authentication processing unit 204. In step S508, the authentication processing unit 204 that has received the authentication information 520 calculates (PWMD5+ch)×MD5 (authentication information 521) based on the password stored in the password storage unit 205 and the challenge value generated in step S502. In this case, the old device uses the general encryption provider 208 and the new device uses the FIPS encryption provider 207 and the general encryption provider 208 differently depending on the authentication information encryption scheme stored in the password storage unit 205. How to use the FIPS encryption provider 207 and the general encryption provider 208 differently will be described in detail with reference to block diagrams of FIGS. 7 to 10 and flowcharts of FIGS. 11A, 11B, and 11C.

In step S509, the authentication information 520 is compared with the calculated authentication information 521, and an authentication result (success/failure) is determined depending on whether the authentication information 520 matches the calculated authentication information 521. In step S510, the challenge value stored in the memory is discarded.

In step S511, the authentication result in step S509 is returned to the device operation I/F service 203. If the authentication processing is successful (authentication result is a success), in step S513, the device operation I/F service 203 requests the various operations processing unit 209 to perform instructed operation processing.

There are various types of operation processing, and thus detailed descriptions of processing contents are omitted. In step S514, after completion of the operation processing, an operation processing result is returned to the device operation I/F service 203.

In step S515, the device operation I/F service 203 returns the operation processing result to the operation instruction generation unit 302.

If the authentication processing is unsuccessful (authentication result is a failure), the device operation I/F service 203 transmits the authentication result to the operation instruction generation unit 302 without sending an operation processing request to the various operations processing unit 209.

Figure 6:
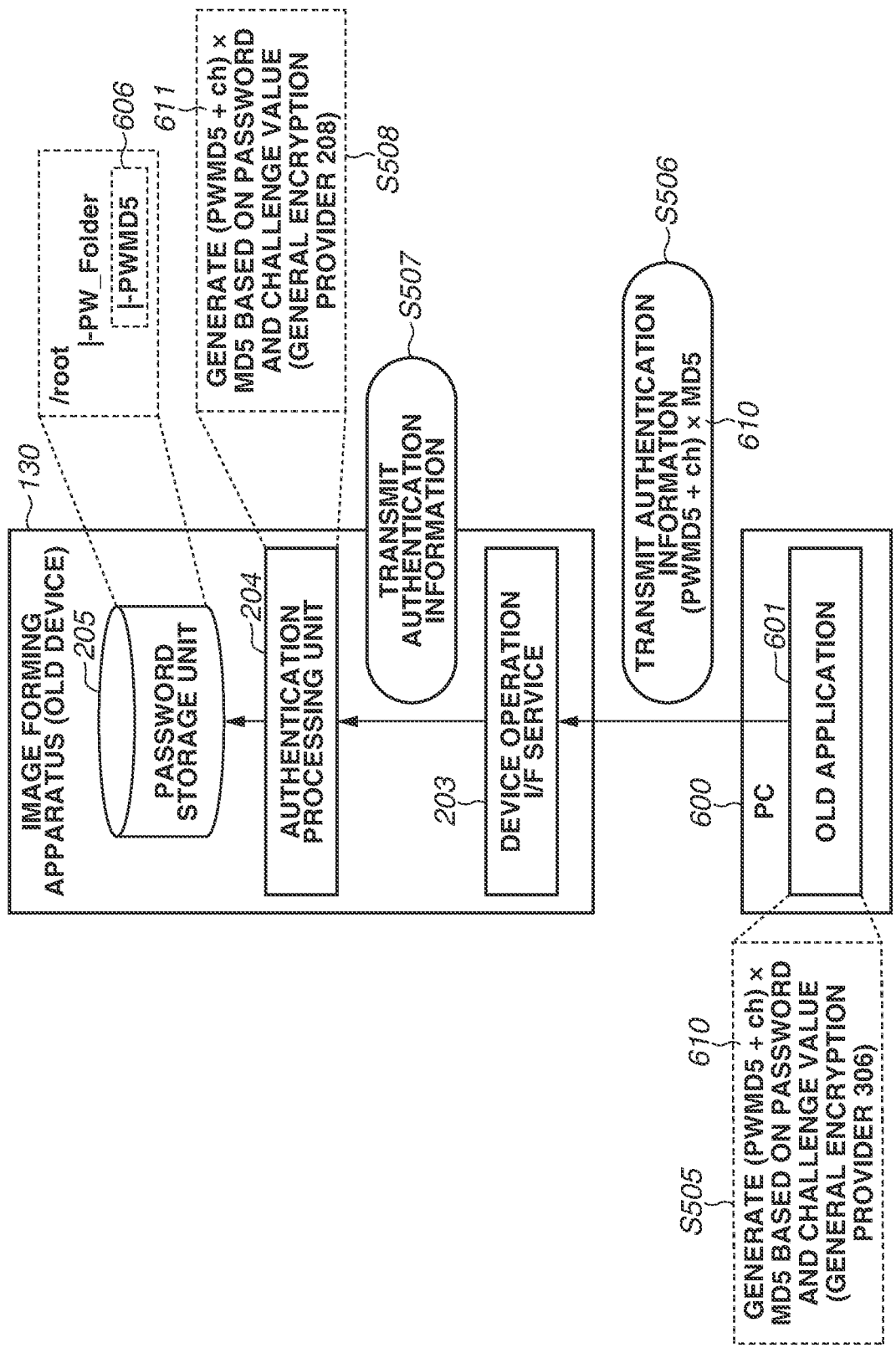
FIG. 6 is a block diagram illustrating authentication processing using a combination of an old application and an old image forming apparatus.

FIG. 6 is a block diagram illustrating authentication processing using a combination of the device operation application 300 (old application) and the image forming apparatus 130 (old device). Step numbers in FIG. 5 respectively correspond to step numbers in FIG. 6.

The password storage unit 205 of the image forming apparatus 130 stores PWMDS (606), or a MD5 hash value, under "PW_Folder" in a root folder in a state where the password is TPM-encrypted.

An old application 601 installed on a PC 600 generates authentication information using the general encryption provider 306 as described in step S505. In step S506, the old application 601 transmits authentication information (PWMD5+ch)×MD5 (610) to the device operation I/F service 203.

In step S507, the device operation I/F service 203 that has received the authentication information transmits the authentication information 610 to the authentication processing unit 204. In step S508, the authentication processing unit 204 that has received the authentication information 610 acquires the password 606 stored in the password storage unit 205, generates authentication information 611 using the general encryption provider 208, and compares the authentication information 611 with the received authentication information 610. The outline of the authentication processing using a combination of the old device and the old application has been described above.

A case where the PC 600 and the image forming apparatus 130 are changed to the FIPS mode-supporting devices is considered.

To support the FIPS mode, it is necessary that the provider that supports the FIPS mode execute processing in steps S505 and S508 illustrated in FIG. 6. However, the authentication processing cannot be executed by simply replacing the providers. This is because even when the image forming apparatus 130 is changed to support the FIPS mode, PWMD5 (606) is stored as the password in the password storage unit 205, and authentication information cannot be verified unless the password sent from the PC 600 is encrypted using the MD5 hash scheme.

In this regard, a method for changing the old device and the old application each to a version supporting the FIPS mode will be described with reference to FIGS. 7 to 10.

Figure 7:
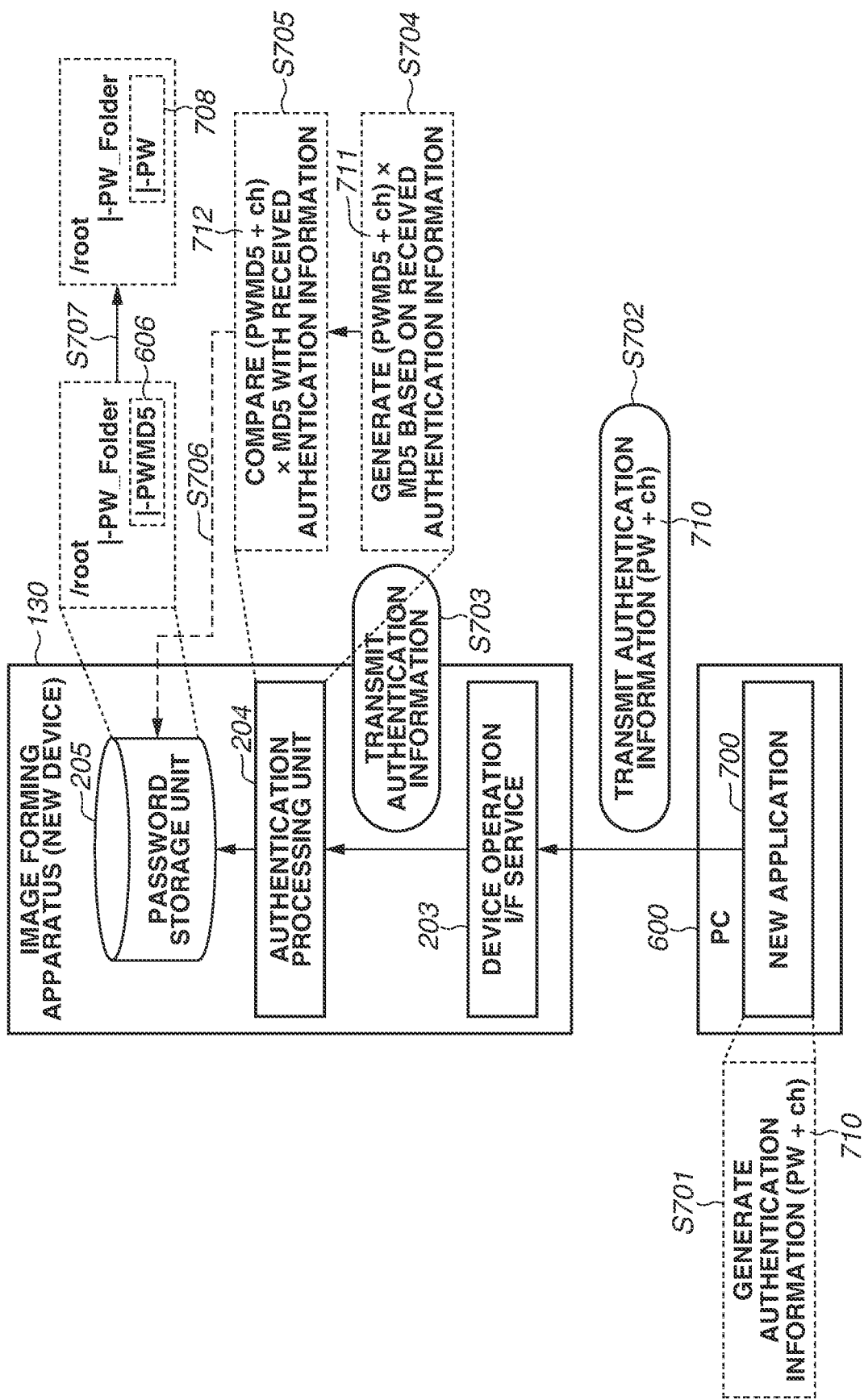
FIG. 7 is a block diagram illustrating authentication processing using a combination of a new application and a new device (old password method).

FIG. 7 is a block diagram illustrating authentication processing using a combination of the new application and the new device. The password storage unit 205 stores PWMD5 (606), which is the same password stored in the old device in the old password method.

In step S701, a new application 700 generates authentication information PW+ch (710). In step S702, the new application 700 transmits the authentication information PW+ch (710) to the device operation I/F service 203.

In step S703, the device operation I/F service 203 that has received the authentication information 710 transmits the authentication information 710 to the authentication processing unit 204. In step S704, the authentication processing unit 204 that has received the authentication information 710 extracts a password (PW) from the received authentication information PW+ch (710). Based on the extracted PW, authentication information (PWMD5+ch)×MD5 (711) is generated using the general encryption provider 208.

In step S705, the general encryption provider 208 acquires the password 606 stored in the password storage unit 205, and generates authentication information 712. The authentication processing unit 204 compares the authentication information 712 with the authentication information 711. As a result of comparison, if the authentication information 712 matches the authentication information 711, in step S706, the authentication processing unit 204 transmits the PW extracted from the authentication information 710 to the password storage unit 205. In step S707, the password storage unit 205 that has received the PW stores a password of a password method 708, or the new password method, under "PW_Folder" in the root folder in a state where the password is TPM-encrypted. On the other hand, PWMD5 (606) of the conventional old password method is deleted. The processing illustrated in FIG. 7 enables another encryption scheme (password method) to be shifted from the old password method to the new password method, thereby making it possible to perform authentication processing without using the MD5 encryption scheme in the subsequent authentication processing. The authentication processing to be performed in this case will be described below with reference to FIG. 8. The term "encryption scheme" refers to an encryption algorithm to be applied to authentication information, and the term "password method" refers to a password method obtained after the encryption algorithm is applied to the password.

Figure 8:
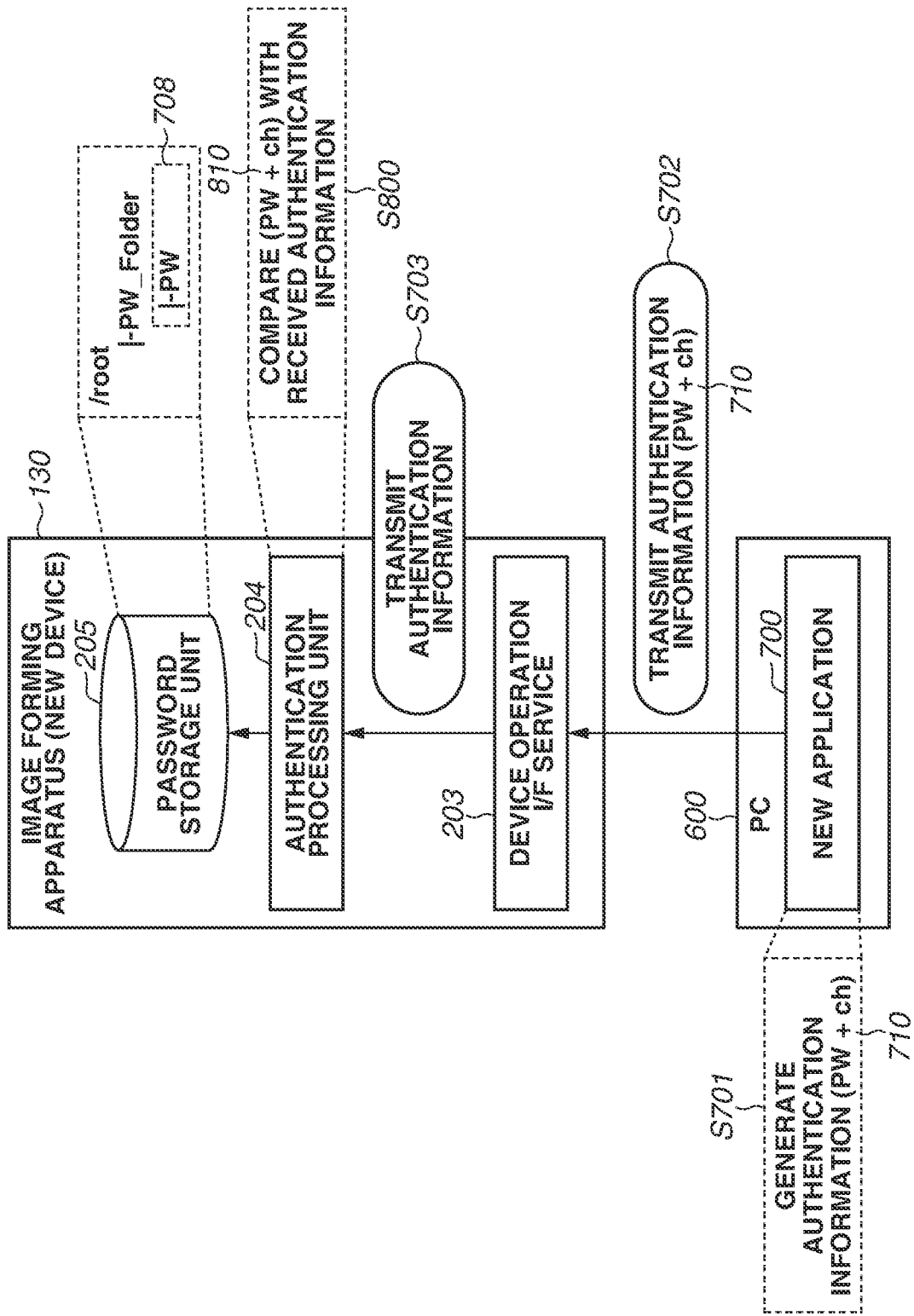
FIG. 8 is a block diagram illustrating authentication processing using a combination of the new application and the new device (new password method).

FIG. 8 is a block diagram illustrating authentication processing including authentication determination processing using a combination of the new application and the new device (new password method). In step S701, the new application 700 installed on the PC 600 generates authentication information PW+ch (710). In step S702, the new application 700 transmits the authentication information PW+ch (710) to the device operation I/F service 203.

In step S703, the device operation I/F service 203 that has received the authentication information 710 transmits the authentication information 710 to the authentication processing unit 204. In step S800, the authentication processing unit 204 that has received the authentication information 710 acquires the password of the password method 708 stored in the password storage unit 205, generates authentication information 810 by adding the challenge value ch to the password, and compares the generated authentication information 810 with the authentication information 710 to thereby perform authentication processing. The authentication processing illustrated in FIG. 8 does not use the general encryption provider 208 that uses the MD5 encryption scheme.

As described above, according to the first exemplary embodiment, even when the device is changed from the old device to the new device supporting the FIPS mode, the user can change the password method of the password stored in the image forming apparatus 130 by simply performing a normal authentication operation.

A second exemplary embodiment is described considering an environment in which a plurality of applications that use the device operation I/F service 203 exists, and old and new applications coexist in the plurality of applications. In this case, possibly, an authentication request may be sent from the old application before and after the password method is shifted to the new password method 708 illustrated in FIG. 7. If the password method is shifted to the new password method by the processing illustrated in FIG. 7, the authentication request from the old application cannot be processed. The present exemplary embodiment describes an example of processing for dealing with such a situation.

FIG. 9 is a block diagram illustrating authentication processing including authentication determination processing using a combination of the old application and the new device (old password method). FIG. 9 illustrates a state where processing (FIG. 7) for shifting the password method to the new password method is executed.

PWMD5 (606), or an MD5 hash value of the old password method, is stored under "PW_Folder" in the root folder in a state where the password is TPM-encrypted. The old application 601 is installed on the PC 600. In step S505, the old application 601 generates authentication information using the general encryption provider 306.

In step S506, the old application 601 transmits the authentication information (PWMD5+ch)×MD5 (610) to the device operation I/F service 203. In step S507, the device operation I/F service 203 that has received the authentication information transmits the authentication information 610 to the authentication processing unit 204. In step 508, the authentication processing unit 204 that has received the authentication information 610 acquires the password 606 stored in the password storage unit 205, generates the authentication information 611 using the general encryption provider 208, and compares the generated authentication information 611 with the received authentication information 610 to thereby perform the authentication processing.

FIG. 10 is a block diagram illustrating authentication processing using a combination of the old application and the new device (new password method). FIG. 10 illustrates a state after the password method of the password stored in the password storage unit 205 is shifted to the new password method when the authentication processing from the new application illustrated in FIG. 7 is successful.

In step S505, the old application 601 installed on the PC 600 generates authentication information using the general encryption provider 306. In step S506, the old application 601 transmits the authentication information (PWMD5+ch)×MD5 (610) to the device operation I/F service 203.

In step S507, the device operation I/F service 203 that has received the authentication information 610 transmits the authentication information 610 to the authentication processing unit 204. In step S1000, the authentication processing unit 204 that has received the authentication information 610 acquires the password of the password method 708 stored in the password storage unit 205, and generates authentication information 1010 using the FIPS encryption provider 207. In this case, since the FIPS encryption provider 207 is used, when the FIPS mode management unit 206 indicates that the FIPS mode is on, authentication information cannot be successfully generated, and the authentication processing fails. For this reason, if the application is used in the combination of the old application and the new device (new password method), it may be desirable to turn off the FIPS mode.

If the authentication information 1010 is generated, the authentication processing unit 204 compares the generated authentication information 1010 with the received authentication information 610 to thereby perform the authentication determination processing.

Figure 11A:
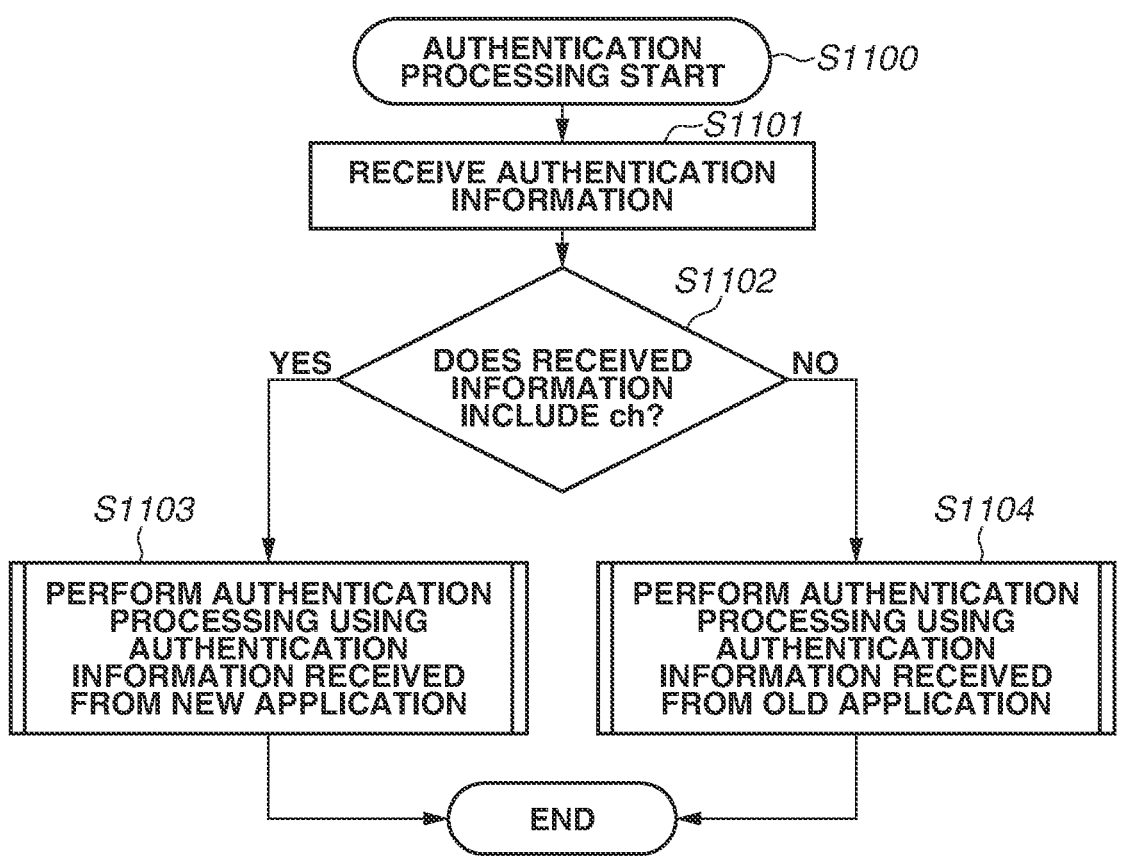
FIG. 11A is a flowchart illustrating processing in which a device operation interface (I/F) service that has received a password determines which one of authentication processing corresponding to the old application and authentication processing corresponding to the new application is performed.
Figure 11B:
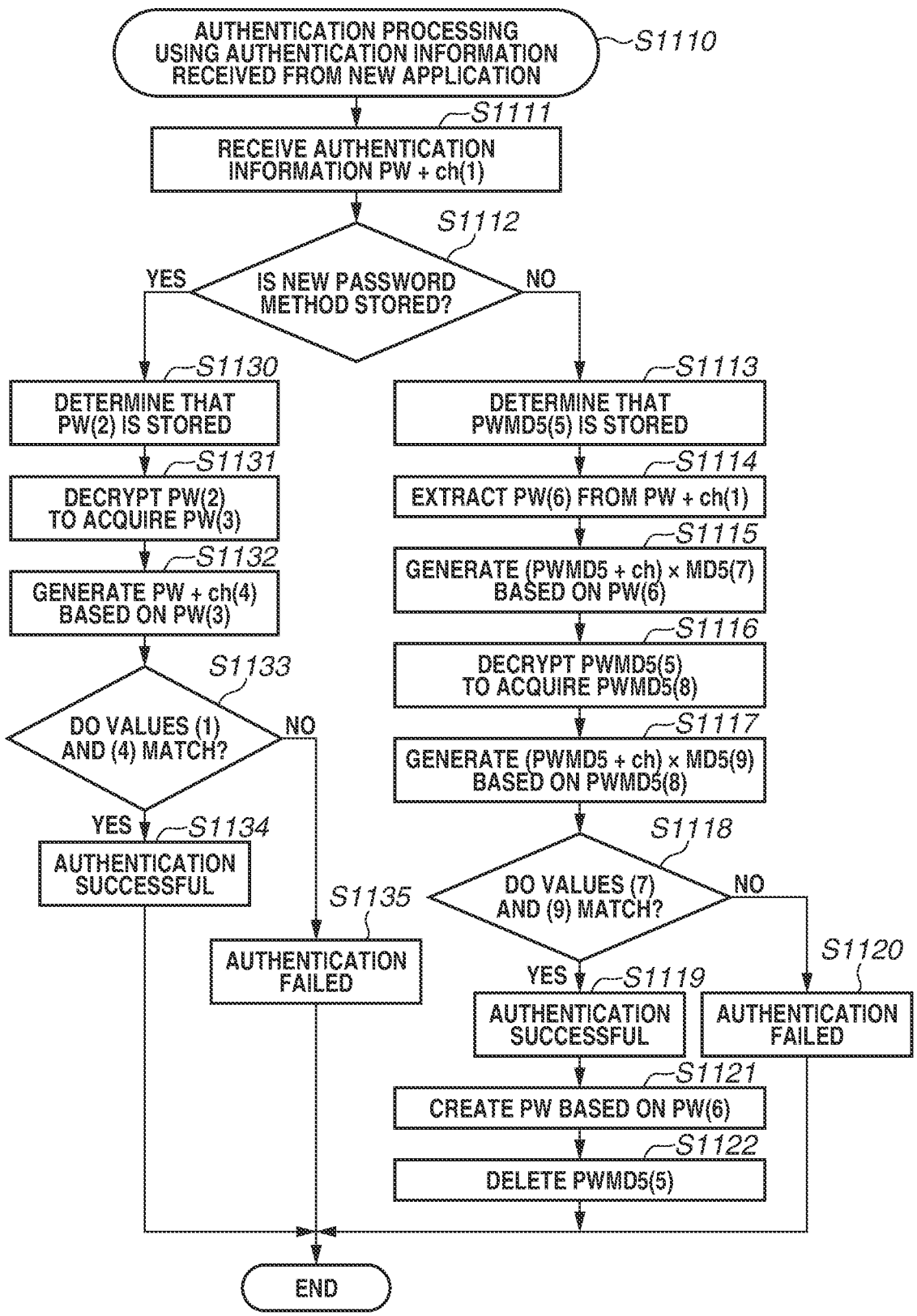
FIG. 11B is a flowchart illustrating authentication processing in an authentication processing unit when the device operation I/F service determines that the password is received from the new application in FIG. 11A.
Figure 11C:
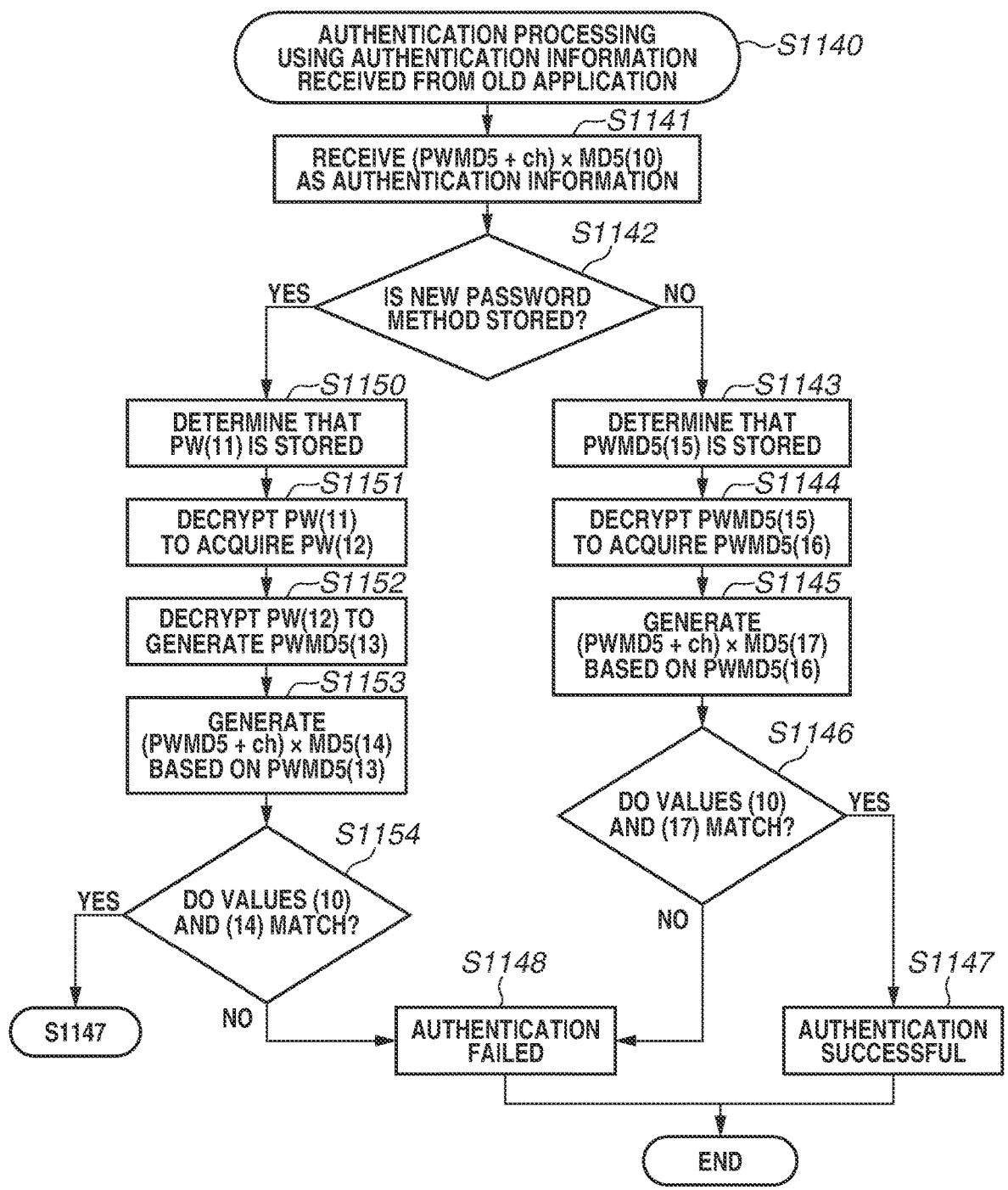
FIG. 11C is a flowchart illustrating authentication processing in the authentication processing unit when the device operation I/F service determines that the password is received from the old application in FIG. 11A.

FIGS. 11A, 11B, and 11C are flowcharts each illustrating authentication processing using a combination of the old application, the new application, and the new device according to the first and second exemplary embodiments described above.

FIG. 11A is a flowchart illustrating processing for determining which one of authentication processing corresponding to the old password method and authentication processing corresponding to the new password method is to be performed based on the password method of the password received from the device operation application 300.

When the authentication processing is started in step S1100, the device operation I/F service 203 receives authentication information from the device operation application 300 in step S1101. In step S1102, it is determined whether the received authentication information includes the challenge value ch. If it is determined that the received authentication information includes the challenge value ch (YES in step S1102), it is determined that the device operation application 300 is the new application, and the processing proceeds to step S1103. This is because the authentication information PW+ch (710) is received from the new application.

On the other hand, if it is determined that the received authentication information does not include the challenge value ch (NO in step S1102), it is determined that the device operation application 300 is the old application, and the processing proceeds to step S1104. This is because the authentication information (PWMD5+ch)×MD5 is received from the old application.

In step S1103, the device operation I/F service 203 starts processing illustrated in FIG. 11B when the authentication information is transmitted to the authentication processing unit 204.

FIG. 11B illustrates authentication processing to be executed by the authentication processing unit 204 when it is determined that the device operation I/F service 203 has received the password from the new application as illustrated in FIG. 11A.

In step S1110, the authentication processing is started. In step S1111, the device operation I/F service 203 receives authentication information PW+ch (1). In step S1112, the password method of the password stored in the password storage unit 205 is checked. Specifically, the password method 708 stored under "PW_Folder" in the root folder is checked. If the password method corresponding to the old password method is stored (NO in step S1112), the processing proceeds to step S1113. Processing of step S1113 and subsequent steps corresponds to the processing described above with reference to FIG. 7. As a result of determination in step S1112, if it is determined that the password method corresponding to the new password method is stored (YES in step S1112), the processing proceeds to step S1130. Processing of step S1130 and subsequent steps corresponds to the processing described above with reference to FIG. 8.

In step S1113, it is determined that TPM-encrypted PWMD5 (5) is stored as the password. In step S1114, PW (6)

is extracted from PW+ch (1). In step S1115, (PWMD5+ch)× MD5 (7) is generated based on PW (6) using the general encryption provider 208.

In step S1116, PWMD5 (5) that is encrypted by TPM and stored in the password storage unit 205 is decrypted to thereby acquire PWMD5 (8). In step S1117, (PWMD5+ch)× MD5 (9) is generated using the general encryption provider 208 based on PWMD5 (8). In step S1118, the authentication processing unit 204 compares the value (7) with the value (9). If the values (7) and (9) match (YES in step S1118), the processing proceeds to step S1119. In step S1119, it is determined that the authentication is successful. On the other hand, in step S1118, if the values (7) and (9) do not match (NO in step S1118), the processing proceeds to step S1120. In step S1120, it is determined that the authentication has failed. When it is determined that the authentication is successful, at least some of functions provided by the image forming apparatus 130 can be used via the device operation application 300. The same holds true when it is determined that the authentication is successful as described below.

In step S1121, PW (6) is encrypted by the TPM encryption scheme and the encrypted PW (6) is stored. In step S1122, the password storage unit 205 deletes PWMD5 (5).

In step S1112, if it is determined that the stored password method is PW (YES in step S1112), the processing proceeds to step S1130. In step S1130, it is determined that TPM-encrypted PW (2) is stored as the password.

In step S1131, TPM-encrypted PW (2) is decrypted to acquire PW (3). In step S1132, PW+ch (4) is generated by adding the challenge value ch to PW (3). In step S1133, the value (1) is compared with the value (4). If the values (1) and (4) match (YES in step S1133), the processing proceeds to step S1134. In step S1134, it is determined that the authentication is successful. On the other hand, in step S1133, if the values (1) and (4) do not match (NO in step S1133), the processing proceeds to step S1135. In step S1135, it is determined that the authentication has failed. The processing illustrated in FIGS. 11A and 11B has been described above.

FIG. 11C is a flowchart illustrating authentication processing in the authentication processing unit 204 when it is determined that the device operation I/F service 203 has received the password from the old application in FIG. 11A.

In step S1140, authentication processing is started. In step S1141, it is determined that authentication information received from the old application is (PWMD5+ch)×MD5 (10) is.

In step S1142, the password method of the stored PW is checked. The method for checking the password method has been described in detail above in step S1112. If the old password method is stored as the password method (NO in step S1142), the processing proceeds to step S1143. Processing of step S1143 and subsequent steps corresponds to the processing described above with reference to FIG. 9. In step S1143, it is determined that the TPM-encrypted PWMD5 (15) is stored as the password. In step S1144, PWMD5 (15) is decrypted to acquire PWMD5 (16).

In step S1145, (PWMD5+ch)×MD5 (17) is generated using the general encryption provider 208 based on PWMD5 (16).

In step S1146, the authentication processing unit 204 compares the value (10) with the value (17). If the values (10) and (17) match (YES in step S1146), the processing proceeds to step S1147. In step S1147, it is determined that the authentication is successful. On the other hand, if the values (10) and (17) do not match (NO in step S1146), the processing proceeds to step S1148. In step S1148, it is determined that the authentication has failed.

In step S1142, if it is determined that the new password method 708 is stored as the password method of the password (YES in step S1142), the processing proceeds to step S1150. Processing of step S1150 and subsequent steps corresponds to the processing illustrated in FIG. 10.

In step S1150, it is determined that TPM-encrypted PW (11) is stored as the password. In step S1151, the TPM-encrypted PW (11) is decrypted to acquire PW (12).

In step S1152, PWMD5 (13) is generated using the FIPS encryption provider 207 based on PW (12). In this case, since the FIPS encryption provider 207 is used, in a case where the FIPS mode management unit 206 indicates that the FIPS mode is on, MD5 hash cannot be used, and authentication processing in step S1154 to be described below fails. For this reason, it is necessary to turn off the FIPS mode in advance.

In step S1153, (PWMD5+ch)×MD5 (14) is generated using the FIPS encryption provider 207 based on PWMD5 (13). In step S1154, the value (10) is compared with the value (14). If the values (10) and (14) match (YES in step S1154), the processing proceeds to step S1147. In step S1147, it is determined that the authentication is successful. If the values (10) and (14) do not match (NO in step S1154), the processing proceeds to step S1148. In step S1148, it is determined that the authentication has failed. The processing illustrated in FIG. 11C has been described above.

FIG. 12 is a block diagram illustrating information indicating whether each authentication method is enabled or disabled in the entire system when the version of the device is upgraded from the old device to the new device.

Authentication of an old device 1200 from an old application A 1203 is enabled as illustrated in step S1210. After that, in step S1211, the version of the device is upgraded from the old device 1200 to a new device (old password method) 1201.

Authentication of the new device (old password method) 1201 from the old application A 1203 is enabled as illustrated in step S1212. The processing has been described above with reference to FIG. 9. Similarly, authentication of the new device (old password method) 1201 from an old application B 1205 is enabled as illustrated in step S1213.

In step S1214, the version of the application is upgraded from the old application A 1203 to a new application A 1204. Authentication of the new device (old password method) 1201 from the new application A 1204 is enabled as illustrated in step S1215. In this case, if the authentication processing is successful, the version of the device is shifted to a new device (new password method) 1202 as illustrated in step S1216. The processing has been described in detail above with reference to FIG. 7.

Authentication of the new device (new password method) 1202 from the new application A 1204 is enabled as illustrated in step S1217. The processing has been described in detail above with reference to FIG. 8.

In this case, authentication of the new device (new password method) 1202 from the old application B 1205 is disabled when the FIPS mode is on as illustrated in step S1218. On the other hand, when the FIPS mode is off, the authentication is enabled. The processing has been described in detail above with reference to FIG. 10. Specifically, since the processing of step S1216 is executed, first authentication processing using the old application A 1203 and the new device (old password method) 1201 succeeds. However, second and subsequent authentication processing using the old application A 1203 does not succeed unless the FIPS mode of the new device (new password method) 1202 is turned off.

Not only the configuration in which the processing of step S1216 is executed when the first authentication processing using the old application A 1203 and the new device (old password method) 1201 is successful, but also a configuration in which the processing of step S1216 is not executed within a predetermined period, or a configuration in which the processing of step S1216 is executed only after authentication processing using the old application A 1203 and the new device (old password method) 1201 is successfully performed a predetermined number of times can be adopted.

The method according to the second exemplary embodiment described above makes it possible to perform the authentication processing on authentication information received from the old application by turning off the FIPS mode of the device, in consideration of an environment where old and new applications coexist even after the device is changed to support the FIPS mode.

According to embodiments of the present disclosure, it is possible to manage authentication information that can be used by a new authentication method to change a device not supporting the FIPS mode to a FIPS-supporting device, while saving user's time and effort to reset the authentication information.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-163198, filed Oct. 4, 2021, which is hereby incorporated by reference herein in its entirety.

What is claimed is:

1. An information processing apparatus that executes authentication processing using authentication information received from a terminal, the information processing apparatus comprising:
at least one memory storing instructions; and
one or more processors configured by the instructions to perform operations comprising:
executing first authentication processing using second authentication information and preliminarily managed authentication information, the second authentication information being obtained by encrypting first authentication information received from the terminal;
executing second authentication processing different from the first authentication processing; and
enabling a Federal Information Processing Standards (FIPS) mode,
wherein, in a case where the second authentication information is authenticated in the first authentication processing, the first authentication information is managed to be usable in the second authentication processing, and
wherein, in a case where the FIPS mode is enabled, after executing the first authentication processing using the second authentication information, the one or more processors execute the second authentication processing using the authentication information received from the terminal.

2. The information processing apparatus according to claim 1, wherein the FIPS mode is a mode for prohibiting use of a specific encryption scheme.

3. The information processing apparatus according to claim 2,
wherein the specific encryption scheme includes a Message Digest algorithm (MD) 5 hash scheme, and
wherein the MD5 hash scheme is an encryption scheme used to acquire the second authentication information from the first authentication information.

4. The information processing apparatus according to claim 1, wherein, in a case where the FIPS mode is not enabled, the information processing apparatus uses the first authentication processing to authenticate the authentication information received from the terminal even after the second authentication information is authenticated in the first authentication processing.

5. The information processing apparatus according to claim 1, wherein, in a case where the FIPS mode is not enabled, the information processing apparatus uses the first authentication processing to authenticate the authentication information received from the terminal without managing the first authentication information even after the second authentication information is authenticated in the first authentication processing.

6. The information processing apparatus according to claim 1,
wherein the information processing apparatus is an image forming apparatus having at least a print function, and
wherein, in a case where the first authentication information is authenticated in the first authentication processing or the second authentication processing, the image forming apparatus provides at least one function that the image forming apparatus has to the terminal having transmitted the first authentication information.

7. A control method for an information processing apparatus that executes authentication processing using authentication information received from a terminal, the control method comprising:

executing first authentication processing using second authentication information and preliminarily managed authentication information, the second authentication information being obtained by encrypting first authentication information received from the terminal;

executing second authentication processing different from the first authentication processing; and enabling a Federal Information Processing Standards (FIPS) mode, wherein, in a case where the second authentication information is authenticated in the first authentication processing, the first authentication information is managed to be usable in the second authentication processing, and wherein, in a case where the FIPS mode is enabled, after executing the first authentication processing using the second authentication information, the second authentication processing is executed using the authentication information received from the terminal.

8. A non-transitory computer-readable storage medium storing a program including instructions, which when executed by one or more processors of an information processing apparatus that executes authentication processing using authentication information received from a terminal, cause the information processing apparatus to:

execute first authentication processing using second authentication information and preliminarily managed authentication information, the second authentication information being obtained by encrypting first authentication information received from the terminal;

execute second authentication processing different from the first authentication processing; and enable a Federal Information Processing Standards (FIPS) mode, wherein, in a case where the second authentication information is authenticated in the first authentication processing, the first authentication information is managed to be usable in the second authentication processing, and wherein, in a case where the FIPS mode is enabled, after executing the first authentication processing using the second authentication information, the second authentication processing is executed using the authentication information received from the terminal.

* * * * *